(12) United States Patent
Gierman et al.

(10) Patent No.: US 9,815,693 B2
(45) Date of Patent: Nov. 14, 2017

(54) PROCESSES FOR PRODUCING SULFURIC ACID FROM SOUR TAIL GAS FIELD

(71) Applicant: CANSOLV TECHNOLOGY INC., Montreal (CA)

(72) Inventors: Menno Bastiaan Hendrik Gierman, Montreal (CA); John Nicholas Sarlis, Laval (CA); Joe Gelder, Fareham (GB); Philippe Micone, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/905,905

(22) PCT Filed: Jul. 18, 2014

(86) PCT No.: PCT/CA2014/050682
§ 371 (c)(1),
(2) Date: Jan. 18, 2016

(87) PCT Pub. No.: WO2015/006873
PCT Pub. Date: Jan. 22, 2015

(65) Prior Publication Data
US 2016/0152470 A1 Jun. 2, 2016

Related U.S. Application Data

(60) Provisional application No. 61/847,953, filed on Jul. 18, 2013.

(51) Int. Cl.
*C01B 17/04* (2006.01)
*C01B 17/76* (2006.01)
*C01B 17/50* (2006.01)

(52) U.S. Cl.
CPC ............ *C01B 17/76* (2013.01); *C01B 17/508* (2013.01)

(58) Field of Classification Search
CPC ............ C01B 17/0404; C01B 17/0447; C01B 17/0456; C01B 17/05; C01B 17/74; C01B 17/76; C01B 17/775
See application file for complete search history.

(56) References Cited

U.S. PATENT DOCUMENTS 5,019,361 A 5/1991 Hakka
5,236,678 A 8/1993 Chang et al.
(Continued)

FOREIGN PATENT DOCUMENTS

| CA | 2746899 | 1/2012 |
| CN | 1736869 | 2/2006 |
| CN | 101152958 | 4/2008 |

(Continued)

*Primary Examiner* — Timothy Vanoy

(57) ABSTRACT

A method of producing sulphuric acid from a sour tail gas comprises (a) obtaining a sour tail gas stream comprising $H_2S$ or reduced sulphur species or a combination thereof from an oil and gas facility; (b) subjecting the sour tail gas stream to oxidation and obtaining an oxidized gas stream comprising $SO_2$; and, (c) utilizing the oxidized gas stream to obtain sulphuric acid and a $SO_2$ reduced tail gas stream. The method may further comprise subjecting the oxidized gas stream to a regenerable absorption process. The sulphuric acid may be used to produce fertilizer.

13 Claims, 3 Drawing Sheets

(56) References Cited

U.S. PATENT DOCUMENTS 5,262,139 A     11/1993  Hakka et al.
2008/0216478 A1  9/2008  Cherry

FOREIGN PATENT DOCUMENTS

| | | | | | |
|---|---|---|---|---|---|
| CN | 101618863 | A | * | 1/2010 | ............. C01B 17/74 |
| CN | 101641284 | A | | 2/2010 | |
| CN | 101721894 | | | 6/2010 | |
| CN | 102198365 | A | * | 9/2011 | ......... C01B 17/0404 |
| CN | 102371108 | A | | 3/2012 | |
| CN | 102413902 | A | | 4/2012 | |
| CN | 102198365 | B | * | 7/2013 | ......... C01B 17/0404 |
| CN | 203668003 | U | | 6/2014 | |
| CN | 102198365 | A | * | 11/2015 | ............. C01B 17/04 |
| DE | 4404997 | | | 8/1995 | |
| DE | 102010018172 | | | 10/2014 | |
| EP | 1816103 | | | 8/2007 | |
| NL | 2008801 | C | * | 5/2013 | ......... C01B 17/0404 |
| WO | 2010075027 | | | 7/2010 | |
| WO | 2013045558 | | | 4/2013 | |

* cited by examiner

PROCESSES FOR PRODUCING SULFURIC ACID FROM SOUR TAIL GAS FIELD

CROSS-REFERENCE TO RELATED APPLICATIONS

This application claims the benefit of U.S. Patent Application No. 61/847,953, filed Jul. 18, 2013, the entirety of which is incorporated herein by reference.

FIELD OF THE INVENTION

The present disclosure broadly relates to a process for converting a sour tail gas into sulfuric acid. More specifically, but not exclusively, the present disclosure relates to a process for producing sulfuric acid from a sour tail gas comprising $H_2S$, particularly an $H_2S$ containing gaseous stream derived from an oil and gas facility. The process is particularly useful when the oil and gas facility includes or is close to a sulfuric acid production unit.

BACKGROUND

Sour gas comprising $H_2S$ can originate from various sources. For example, numerous natural gas wells produce sour natural gas, i.e. natural gas comprising $H_2S$ and optionally other contaminants (e.g. other sulfurous compounds like COS, $CS_2$, RSH, etc.). Natural gas is a general term that is applied to mixtures of light hydrocarbons and optionally other gases (nitrogen, carbon dioxide, helium) derived from natural gas wells. The main component of natural gas is methane. Further, often other hydrocarbons such as ethane, propane, butane or higher hydrocarbons are present.

The Claus process is frequently used for the treatment of hydrogen sulfide recovered from various gas streams, such as hydrocarbon streams, for example natural gas. The multi-step process produces sulfur from gaseous hydrogen sulfide.

The Claus process comprises two steps, a first thermal step and a second catalytic step. In the first thermal step, a portion of the hydrogen-sulfide in the gas is oxidized at temperatures above 850° C. to produce sulfur dioxide and water:

$$2H_2S+3O_2 \rightarrow 2SO_2+2H_2O \quad \text{(I).}$$

In the second catalytic step, the sulfur dioxide produced in the thermal step reacts with hydrogen sulfide to produce sulfur and water:

$$2SO_2+4H_2S \rightarrow 6S+4H_2O \quad \text{(II).}$$

The gaseous elemental sulfur produced in step (II) may be recovered in a condenser, initially as liquid sulfur before further cooling to provide solid elemental sulfur. In some cases, the second catalytic step and sulfur condensing step can be repeated more than once, typically up to three times to improve the recovery of elemental sulfur.

The second catalytic step of the Claus process requires sulfur dioxide, one of the products of reaction (I). However, hydrogen sulfide is also required. Typically, approximately one third of the hydrogen sulfide gas is oxidized to sulfur dioxide in reaction (I), in order to obtain the desired 1:2 molar ratio of sulfur dioxide to hydrogen sulfide for the reaction to produce sulfur in the catalytic step (reaction (II)). The residual off-gases from the Claus process may contain combustible components and sulfur-containing compounds, for instance when there is an excess or deficiency of oxygen (and resultant overproduction or underproduction of sulfur dioxide). Such combustible components can be further processed, suitably in a Claus off-gas treating unit, for instance in a Shell Claus Off-gas Treating (SCOT) unit. The overall reaction for the Claus process can therefore be written as:

$$2H_2S+O_2 \rightarrow 2S+2H_2O \quad \text{(III).}$$

SUMMARY OF THE INVENTION

In one aspect, the present disclosure broadly relates to a process for producing sulfuric acid from sour tail gas derived from oil and gas facility. For example, crude oil may be treated in an oil and gas refinery to obtain various hydrocarbon product streams. The refinery may include hydrocracking and/or hydrorefining stages. During processing, various gas streams are obtained. These gas streams may be treated to recover hydrocarbons. As a result, one or more tail gas streams having a reduced concentration of hydrocarbons may be obtained.

Alternately, natural gas may be fed to a facility and treated to remove contaminants therefrom, including $H_2S$. As a result, one or more tail gas streams having a reduced concentration of hydrocarbons may be obtained. In accordance with this aspect of the disclosure, the sour tail gas may be used as a feedstock to produce sulfuric acid via the production of $SO_2$. Accordingly at least a portion of a sour tail gas stream may be oxidized at elevated temperatures, such as in an incinerator, to produce a $SO_2$ feed stream that may be fed to a sulfuric acid production unit. Conventional Claus installations are costly, both in terms of capital expenditure as well as in terms of operational costs. An advantage of this aspect is that sulfuric acid may be produced in a simplified process route and without the production of elemental sulfur.

In another aspect, the present disclosure broadly relates to a process for producing fertilizer from sour tail gas derived, preferably, from an oil and gas facility.

In an embodiment of the present disclosure, non-limiting sources of sour tail gas include tail gas produced from natural gas processing, shale gas processing, shale oil associated gas processing, refinery acid gas streams, associated gas from conventional oil fields, syngas processing from gasification, acid gas removal units (in combination with the above) and acid gas enrichment units (in combination with the above). In a particular embodiment of the present disclosure, the sour tail gas is obtained from an oil and gas facility.

In a further embodiment of the present disclosure, the sour tail gas may also include COS and/or other reduced sulfur species in addition to $H_2S$. The COS and/or other reduced sulfur species may be separated from the rest of the gas and the $H_2S$, and solely sent to the incinerator to be oxidized.

In a further embodiment of the present disclosure, the sulfuric acid produced may be converted into fertilizer and/or used in various chemical and/or metallurgical processes such as ore processing (e.g., froth flotation) or traded as a commodity.

In a further embodiment, waste heat may be utilized to provide a heat source, such as by indirect heat exchange, to produce steam, a heated process stream, or the like.

In an embodiment of the present disclosure, the sour tail gas may also include additional sources of sulfur, non-limiting examples of which include COS, $CS_2$ and RSH.

In an embodiment, the sour tail gas comprises from 1 to 50 vol. % $H_2S$. In a further embodiment, the sour gas comprises from 10 to 35 vol. % $H_2S$.

In accordance with this aspect, there is provided a method of producing sulfuric acid comprising:

(a) obtaining a sour tail gas stream comprising H₂S or reduced sulphur species or a combination thereof from an oil and gas facility;

(b) subjecting the sour tail gas stream to oxidation and obtaining an oxidized gas stream comprising SO₂; and, (c) utilizing the oxidized gas stream to obtain sulfuric acid and a SO₂ reduced tail gas stream.

In one embodiment, the method further comprises subjecting the oxidized gas stream to a regenerable absorption process, preferably a regenerable amine absorption process, and obtaining a SO₂ rich gas stream and a SO₂ reduced oxidized gas stream, and step (c) comprises feeding the SO₂ rich gas stream to a sulfuric acid production unit and obtaining sulfuric acid and a SO₂ reduced tail gas stream.

In another embodiment, the method further comprises recycling at least a portion of the SO₂ reduced tail gas stream to obtain additional sulfuric acid. At least a portion of the SO₂ reduced tail gas stream may be recycled to the sulfuric acid production unit.

In another embodiment, the method further comprises subjecting at least a portion of the SO₂ reduced tail gas stream to a SO₂ scrubbing. Process and obtaining an enriched SO₂ tail gas stream and recycling at least a portion of the SO₂ enriched tail gas stream to obtain additional sulfuric acid. The SO₂ scrubbing may comprise a regenerable amine absorption process. Step (b) may comprise feeding the feed gas stream to an incinerator.

In another embodiment, the method further comprises utilizing at least a portion of the sulfuric acid to produce fertilizer.

In another embodiment, the method further comprises utilizing at least a portion of the sulfuric acid to produce fertilizer at a facility that is part of or proximate the oil and gas facility.

In another embodiment, the method further comprises subjecting at least a portion of the SO₂ reduced tail gas stream to a SO₂ absorption process and obtaining a further reduced tail gas stream.

In another embodiment, heat produced by the oxidation and/or the sulfuric acid production unit is used in the regenerable absorption process.

In another embodiment, water purged from the regenerable absorption process is used in the sulfuric acid production unit.

The foregoing and other objects, advantages and features of the present disclosure will become more apparent upon reading of the following nonrestrictive description of illustrative embodiments thereof, given by way of example only with reference to the accompanying drawings.

DETAILED DESCRIPTION

Figure 1:
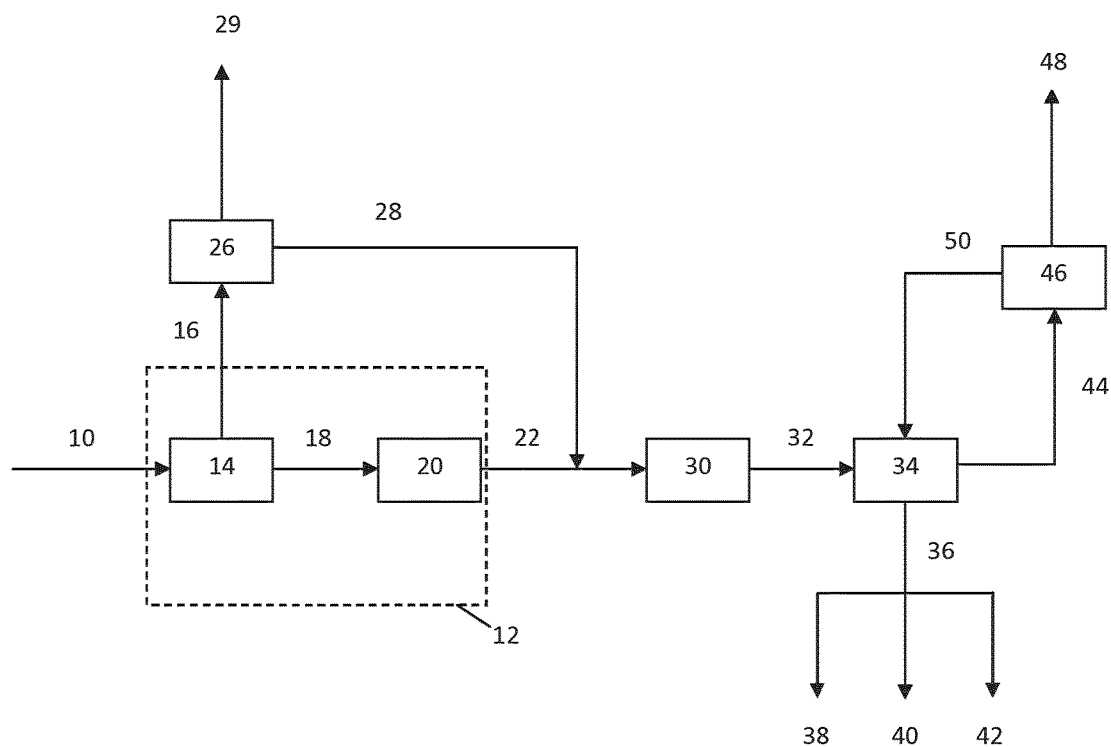
FIG. 1 is a schematic drawing of a process for producing sulfuric acid from sour tail gas in accordance one embodiment of the present disclosure.

FIG. 1 exemplifies an embodiment of the present disclosure wherein incoming hydrocarbon feedstock 10 is treated in an oil and gas facility to obtain a sour tail gas stream 22, 28. As shown therein, oil and gas refinery 12 includes a gas/liquid separation unit 14 which produces a gas stream 16 which may comprise, for example, natural gas or other hydrocarbon gas containing a high concentration of methane, and a gas reduced liquid stream 18 which may be treated in a refinery 20 to obtain one or more sour gas streams 22 and one or more liquid product streams 24. Refinery 20 may be of various designs depending upon the feedstock 10 which is provided and may include various hydrocracking and/or hydrorefining and/or hydrofinishing units. It will be appreciated that gas stream 16 may contain elevated levels of contaminants including H₂S and this gas stream may be treated such as in a scrubbing unit 26, for the production of a product hydrocarbon 29 stream having a reduced concentration of contaminants and a tail gas stream 28.

Gas streams 22, 28 may have a low concentration of hydrocarbons, for example the concentration of hydrocarbons may be less than 1 molar percent, or less than 0.1 molar percent, or less than 0.01 molar percent based on the total composition of the stream. The concentration of H₂S may be more than 25 molar percent, more than 50 molar percent, more than 75 molar percent, more than 95 molar percent, or more than 0.1 and less than 0.25 molar percent based on the total composition of the stream.

For example, stream 10 and/or stream 16 may comprise, consist essentially of or consist of natural gas. Natural gas is typically comprised substantially of methane, normally greater than 50 mol %, typically greater than 70 mol % methane. Depending on the source, the natural gas may contain varying amounts of hydrocarbons heavier than methane such as ethane, propane, butanes and pentanes as well as some aromatic hydrocarbons. The natural gas may also contain various amounts of hydrogen sulfide. For instance, some natural gas fields contain natural gas having 15-30% hydrogen sulfide by volume. The gas may also contain other non-hydrocarbon impurities such as H₂O, N₂, CO₂ and the like.

The impurity content of extracted natural gas has tended to gradually increase over time in association with the decreasing availability of good quality of natural gas. In addition, environmental legislation is becoming stricter in terms of the impurity content of burned gases. As a result, it is becoming increasingly necessary to treat the natural gas to remove the impurity gases therefrom in order to produce a product gas having a desired specification.

As shown in FIG. 1, sour tail gas stream 28 and/or 22 is subjected to oxidation, such as in an incinerator 30 where it is combusted with an oxygen containing gas, e.g., air, to obtain an oxidized gas stream 32 comprising SO₂. Incinerator 30 may be of any design known in the art. The oxygen containing gas may be pure oxygen and/or air and/or oxygen-enriched air. In order to omit the need to separate air to provide oxygen-enriched air or pure oxygen it is preferred to use air to combust the hydrogen sulfide. The hot flue gas that is generated may have a temperature in the range of from 400 to 1100° C. The heat of the hot flue gas may be recovered and may be used, e.g., to generate steam in a heat recovery steam generator.

Oxidized gas stream 32 may be sent to sulfuric acid production unit 34, which removes sulfur dioxide in oxidized gas stream 32 and uses it to generate sulfuric acid stream 36 and SO₂ reduced tail gas stream 44. Sulfuric acid production unit 34 may be of any design known in the art. For example, the sulfur dioxide may be first oxidized to sulfur trioxide, $SO_3$, with oxygen from an oxygen-comprising stream such as air. A catalyst, such a vanadium (V) oxide catalyst may be present.

The gaseous sulfur trioxide may then be treated with water to produce sulfuric acid in an exothermic reaction. In order to control the heat evolved, it is preferred to treat the sulfur trioxide with 2-3 wt % water comprising 97-98 wt % sulfuric acid to produce 98-99 wt % concentrated sulfuric acid.

In an alternative embodiment, the sulfur trioxide can be treated with oleum, $H_2S_2O_7$, to form concentrated sulfuric acid. Such processes together with other methods for manufacturing sulfuric acid from sulfur dioxide are well known to the skilled person. The concentrated sulfuric acid can then be added to water to provide aqueous sulfuric acid.

It will be appreciated that the gas stream used in sulfuric acid production unit 34 may be subjected to scrubbing so as to obtain or maintain a sufficient ratio of oxygen to sulfur dioxide, as well as the ratio of water to $SO_2$, to result in the production of a solution 36 having 93 wt. % or more sulfuric acid.

Sulfuric acid stream 36 may be fed to a fertilizer unit 38, which may be an integral part of a single facility. For example, fertilizer unit 38 may be a part of an oil and gas refinery. Alternately, it may be located proximate thereto. For example, sulfuric acid stream 36 may be fed, such as by a pipeline, taker or the like, to a fertilizer plant that may be located proximate to oil and gas facility 12.

Alternately, or in addition, sulfuric acid stream 36 may be used for ore processing or other uses in the mining industry. Once again, sulfuric acid stream 36 may be fed, such as by a pipeline, taker or the like, to a mining facility and/or an ore processing facility 40 that may be located proximate to oil and gas facility 12.

Alternately, or in addition, sulfuric acid stream 36 may be used as a feedstock for a chemical plant 42. Once again, sulfuric acid stream 36 may be fed, such as by a pipeline, taker or the like, to chemical plant 42 that may be located proximate to oil and gas facility 12.

Alternately, or in addition, sulfuric acid stream 36 may be sold as a commodity.

As shown in FIG. 1, $SO_2$ reduced tail gas stream 44 may be subjected to scrubbing, e.g., in scrubbing unit 46, to produce a tail gas 48 suitable for, e.g., release to the atmosphere. The scrubbing may produce $SO_2$ rich gas stream 50, all or a portion of which may be fed to sulfuric acid production unit 34.

The scrubbing may be conducted using any process known in the art such as, for example, a regenerable amine absorbent process, e.g. the CanSolv process, adsorption, membrane separation or by condensation of the sulfur dioxide. Sulfur dioxide condenses at much higher temperatures, i.e. at approximately $-10°$ C., than for instance nitrogen. Due to the high condensation temperature of sulfur dioxide, the post combustion separation of sulfur dioxide and nitrogen is preferred to the pre-combustion separation of oxygen and nitrogen.

Preferably, the scrubbing comprises, consists essentially of or consists of a regenerable amine-based sulfur dioxide scrubbing process, such as is disclosed in U.S. Pat. Nos. 5,236,678; 5,019,361 and 5,262,139.

Figure 2:
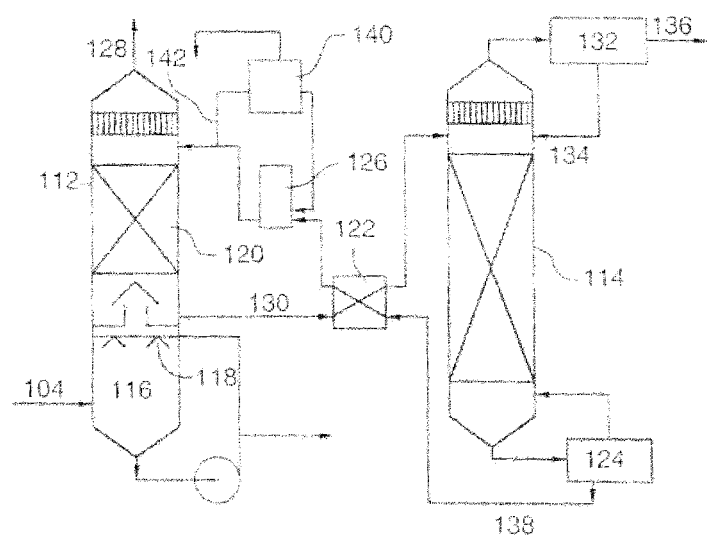
FIG. 2 is a schematic diagram of a regenerable sulfur dioxide process which may be used in accordance with an embodiment of the present disclosure.

FIG. 2 exemplifies a schematic diagram of the Cansolv™ regenerable amine-based sulfur dioxide scrubbing process. Pursuant to this embodiment, a recovery unit 100 utilizes an absorber 112 and a regenerator 114. Feed gas 104 may be fed to pre-scrubber 116 where it is contacted with, e.g., recirculated water from a spray tower 118. This cools and saturates feed gas 104 and results in the removal of a large fraction of the particulate matter in feed gas 104, depending upon their size. Strong acids such as sulfuric and hydrochloric acid may also be scrubbed. The pre-scrubber can also be used as a direct cooler by adding a heat exchanger to the water circulation loop. The level of dissolved acids in the pre-scrubber is controlled by blow-down, neutralizing and discharge into a waste water treatment system. Suspended solids may be controlled by settling.

The pre-scrubbed feed gas may then be fed to absorber 120. Absorber 120 is preferably a mass transfer device for contacting an absorbent with the treated feed gas. As shown in FIG. 2, a counter-current contacting system may be utilized. Any conventional absorber may be used, such as a packed or trayed tower. The scrubbed feed gas which has the sulfur dioxide removed therefrom may be fed via stream 128 to, for example, a stack for discharge to the atmosphere. The exact process to which stream 128 will be subjected will vary depending upon the content of the stream. Preferably, stream 128 contains less than 300 ppm sulfur dioxide, more preferably less than 150 ppm sulfur dioxide and, most preferably less than 100 ppm sulfur dioxide.

According to the Cansolv™ process, the feed gas stream is contacted with a water-soluble half salt of a diamine at a temperature of from about 10° to about 60° C. to absorb sulfur dioxide from the gas stream in amounts of at least about 100 grams of sulfur dioxide per kilogram of absorbing medium. The diamine in free base form preferably has a molecular weight of less than 300 and, in half salt form, has a pKa value for the free nitrogen atom of about 5 to about 7.3.

The rich $SO_2$ laden absorbent stream 130 from absorber 120 may be pumped to regenerator 114 via a rich/lean heat exchanger 122. Regenerator 114 may be a trayed tower with a steam heated re-boiler 124. As the absorbent flows down regenerator 114, the sulfur dioxide is stripped from the liquid and carried overhead into a reflux condenser 132 where most of the steam condenses and is returned to the top of the regenerator as reflux stream 134. The gaseous sulfur dioxide may be stripped from the spent absorbing medium at a temperature of about 50 to about 110° C. The gaseous, water saturated sulfur dioxide leaves the regenerator as stream 136. The lean absorbent leaves re-boiler 124 via stream 138 and is pumped back to absorber 120 via heat exchanger 122 and a surge tank 126.

A slip stream 142 of the lean absorbent is preferably fed to absorbent purification unit 140 wherein heat stable salts may be removed.

Accordingly, a gas stream having an elevated level of $SO_2$ may be obtained by contacting a sour tail gas stream containing sulfur dioxide with an absorbing liquid for $SO_2$ in a $SO_2$ absorption zone to selectively transfer $SO_2$ from the sour tail gas to the absorbing liquid to obtain $SO_2$-enriched absorbing liquid and subsequently stripping $SO_2$ from the $SO_2$-enriched absorbing liquid to produce a lean absorbing liquid and a $SO_2$ enriched gas stream.

Stripping of $SO_2$ from the $SO_2$-enriched absorbing liquid is usually conducted at elevated temperatures. To provide a more energy-efficient process, steam generated in a heat recovery steam generator unit may be used to provide at least part of the heat needed for the stripping of $SO_2$ from the $SO_2$-enriched absorbing liquid.

In other embodiments, energy produced in sulfuric acid production unit 34 and/or incinerator 30 may be used to regenerate the $SO_2$ scrubbing absorbent and/or other energy demanding units and/or steam.

In other embodiments, water purged from the $SO_2$ scrubbing system may be used to feed sulfuric acid production unit 34. For example this water may originate from the quench tower or the reflux system.

Figure 3:
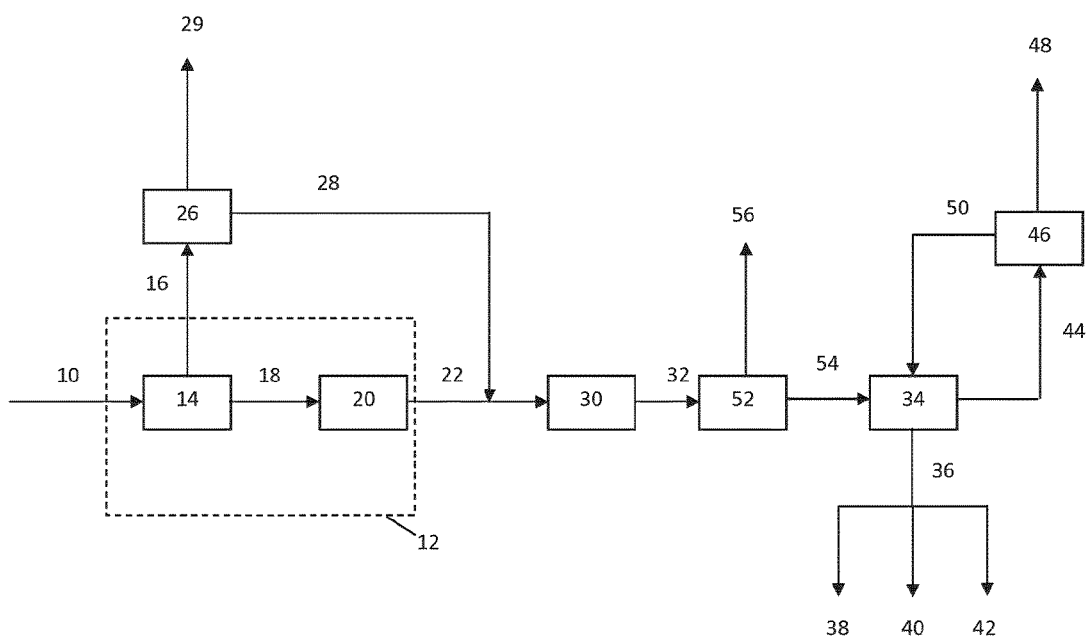
FIG. 3 is a schematic drawing of a process for producing sulfuric acid from sour tail gas in accordance one embodiment of the present disclosure.

In other embodiments of the present disclosure, a process stream containing $SO_2$ may be fed to a regenerable $SO_2$ scrubbing unit. For example, referring to FIG. 3, some or all of the sour tail gas streams 22, 28 may be fed to a treatment unit 52, such as a scrubbing unit. Accordingly, some or all of the sour tail gas streams 22, 28, may be fed to a regenerable amine absorption process and a $SO_2$ rich gas stream 54 and a $SO_2$ reduced oxidized gas stream 56 may be obtained and the $SO_2$ rich gas stream 54 may be fed sulfuric acid production unit 34. In such embodiments, the tail gas 44 from sulfuric acid production unit 34 may optionally be fed to unit 46 and, in addition, some or all of gas stream 50 may be fed to sulfuric acid production unit 34.

It will be appreciated that in any embodiment, waste heat from incinerator 30 and/or sulfuric acid production unit 34 may be used in unit 100, such as to heat re-boiler 124.

It will also be appreciated that in any embodiment, a slip stream from incinerator 30 may be fed to sulfuric acid production unit 34 so as to provide $SO_2$ to sulfuric acid production unit 34.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A method of producing sulfuric acid comprising:
   (a) obtaining a sour tail gas stream comprising $H_2S$ or reduced sulfur species or a combination thereof from an oil and gas facility;
   (b) subjecting the sour tail gas stream to oxidation and obtaining an oxidized gas stream comprising $SO_2$;
   (c) utilizing the oxidized gas stream to obtain sulfuric acid and a $SO_2$ reduced tail gas stream; and
   (d) subjecting the oxidized gas stream to a regenerable absorption process and obtaining a $SO_2$ rich gas stream and a $SO_2$ reduced oxidized gas stream, and step (c) comprises feeding the $SO_2$ rich gas stream to a sulfuric acid production unit and obtaining sulfuric acid and a $SO_2$ reduced tail gas stream.

2. The method of claim 1 further comprising recycling at least a portion of the $SO_2$ reduced tail gas stream to the sulfuric acid production unit.

3. The method of claim 1 further comprising subjecting at least a portion of the $SO_2$ reduced tail gas stream to a $SO_2$ regenerable absorption process and obtaining an enriched $SO_2$ tail gas stream and recycling at least a portion of the $SO_2$ enriched tail gas stream to obtain additional sulfuric acid.

4. The method of claim 3 wherein the $SO_2$ scrubbing comprises a regenerable amine absorption process.

5. The method of claim 3 wherein heat produced by the oxidation and/or the sulfuric acid production unit is used in the regenerable absorption process.

6. The method of claim 3 wherein water purged from the regenerable absorption process is used in the sulfuric acid production unit.

7. The method of claim 1 wherein step (b) comprises feeding the feed gas stream to an incinerator.

8. The method of claim 1 further comprising utilizing at least a portion of the sulfuric acid to produce fertilizer.

9. The method of claim 1 further comprising utilizing at least a portion of the sulfuric acid to produce fertilizer at a facility that is part of or proximate the oil and gas facility.

10. The method of claim 1 wherein the regenerable absorption process is a regenerable amine absorption process.

11. The method of claim 1 further comprising subjecting at least a portion of the $SO_2$ reduced tail gas stream to a $SO_2$ absorption process and obtaining a further reduced tail gas stream.

12. The method of claim 1 wherein heat produced by the oxidation and/or the sulfuric acid production unit is used in the regenerable absorption process.

13. The method of claim 1 wherein water purged from the regenerable absorption process is used in the sulfuric acid production unit.

* * * * *